United States Patent [19]

Okura et al.

[11] E Patent Number: Re. 32,049

[45] Reissued Date of Patent: Dec. 17, 1985

[54] ELECTRICAL CONTACT ARRANGEMENT FOR PHOTOGRAPHIC CAMERA WITH INTERCHANGEABLE LENS

[75] Inventors: Zenichi Okura, Chiba; Yasuyuki Haneishi; Shinsuke Kohmoto, both of Tokyo, all of Japan

[73] Assignee: Asahi Kogaku Kogyo Kabushiki Kaisha, Tokyo, Japan

[21] Appl. No.: 557,540

[22] Filed: Dec. 2, 1983

Related U.S. Patent Documents

Reissue of:

[64] Patent No.: 4,357,089
Issued: Nov. 2, 1982
Appl. No.: 237,987
Filed: Feb. 25, 1981

[30] Foreign Application Priority Data

Feb. 26, 1980 [JP] Japan ..... 55-24447[U]

[51] Int. Cl.[4] ..... G03B 17/00

[52] U.S. Cl. ..... 354/286; 354/271.1

[58] Field of Search ..... 354/455, 197, 295, 270, 354/271.1, 286, 289.1, 289.12, 442; 350/252, 257; 352/142, 231

[56] References Cited

U.S. PATENT DOCUMENTS 3,762,295 10/1973 Kitai ..... 354/286 X
4,104,649 8/1978 Tanaka et al. ..... 354/286 X

FOREIGN PATENT DOCUMENTS 0134571 3/1979 Fed. Rep. of Germany ..... 354/286
0132340 11/1978 Japan ..... 354/289

*Primary Examiner*—William B. Perkey
*Attorney, Agent, or Firm*—Christie, Parker & Hale

[57] ABSTRACT

A camera body having a camera body and an interchangeable lens engageable with the camera body has an improved contact arrangement between camera body and lens. A lens mount has a first flat surface, a camera mount engages a lens mount to join the lens to the camera body, and the camera mount has a second flat surface abutting the first flat surface when the lens mount engages the camera mount. One or more first electrical contacts in the lens mount are movable normal to the first surface between a retracted position approximately flush with the first surface and an extended position projecting from the first surface. A spring urges the one or more first contacts toward the extended position. One or more stationary second electrical contacts in the camera mount open toward the second surface without protruding therefrom in alignment with the respective one or more first contacts when the lens mount engages the camera mount so the one or more first contacts normally bear against the respective one or more second contacts. A manually actuated device retracts the one or more first contacts into a position spaced from the respective one or more second contacts. The lens mount and the camera mount are electrically conductive so the manually actuated device connects and disconnects the one or more first contacts electrically to and from the lens mount to make and break electrical contact between the one or more second contacts and the mounts.

32 Claims, 6 Drawing Figures

ELECTRICAL CONTACT ARRANGEMENT FOR PHOTOGRAPHIC CAMERA WITH INTERCHANGEABLE LENS

Matter enclosed in heavy brackets [ ] appears in the original patent but forms no part of this reissue specification; matter printed in italics indicates the additions made by reissue.

CROSS REFERENCE TO RELATED APPLICATIONS

This application is related to application Ser. No. 237,986, filed on even date herewith by Shinsuke Kawamoto and Yasuyui Haneishi entitled "Locking Mechanism in Diaphragm Setting Ring of SLR Camera", the disclosure of which is incorporated herein fully by reference.

BACKGROUND OF THE INVENTION

This invention relates to electrical transmission of various information concerning a lens to a camera body and, more particularly, to a contact arrangement in an interchangeable lens camera for electrical transmission of specific diaphragm value (fully opened diaphragm value, fully closed diaphragm value), and switching information such as AUTO (automatic diaphragm control), and MANUAL (manual diaphragm control) of the lens to the camera body.

A photographic camera of automatic exposure control type has usually been operated in two modes. In the first mode, an exposure time (shutter speed) is set with priority at the operator's will so that the exposure time thus set is followed by the corresponding lens aperture for automatically obtaining a proper exposure (this mode is generally referred to as automatic exposure control of shutter priority type). In the second mode, a desired diaphragm value is preset at the operator's will and the corresponding exposure time is automatically controlled on the basis of said preset diaphragm value so that a shutter operation at said exposure time gives a proper exposure (this mode is generally referred to as automatically exposure control of diaphragm priority type).

For convenience of explanation, said former mode will be referred to simply as AUTO (automatic diaphragm control) and said latter mode will be referred to simply as MANUAL (automatic shutter control) in the following description. It should be realized that the term "MANUAL" is also used in a broader sense including also a case where photographing is carried out with the diaphragm and the shutter speed both being optionally determined at the operator's will.

With a photographic camera by which one of said both modes are selectively used to perform photographing by utilizing a single camera body and various lenses interchangeably mounted on this camera body, it is necessary to transmit information concerning the respective lenses such as the fully opened diaphragm value and the fully closed diaphragm value of the particular lens to the associated camera body, as already described in application Ser. No. 229,879, filed on Jan. 30, 1981, and application Ser. No. 235,839 and Ser. No. 235,840, filed on Feb. 19, 1981, by Fumio Urano, Zenichi Oura, and Masahiro Kawasaki, corresponding to Japanese patent applications No. 1980-10978, No. 1980-19965, and No. 1980-19966, respectively. The disclosure of these applications is incorporated herein fully by reference.

For automatic exposure control and display of a shutter speed or a diaphragm value based thereon, the information concerning the respective interchangeable lenses such as the fully opened diaphragm value and the fully closed diaphragm value generally is mechanically transmitted to the camera body when the lens is mounted on the camera body. However, such mechanical solution has been disadvantageous in that the necessary high precision information transmission complicates and expands the bulk of the mechanism, increasing the price of the respective interchangeable lenses.

Said prior patent applications have proposed as a solution transmission of the information concerning the lens from the lens directly to the camera body in the form of electrical signals through electrical contacts arranged on mounts of the camera body and the lens, respectively, and biased to project from the associated mounts so that the circuit is closed simultaneously when the lens is mounted on the camera body. With such arrangement, however, there arise problems concerning the information transmission to the electrical contacts on the camera body for AUTO and MANUAL, respectively. For example, one such problem is reading the specific diaphragm values interrupted under intervention of the contact engagement for transmission of the information concerning the fully opened diaphragm value and the fully closed diaphragm value, the mount clamping screws and the lock groove. Furthermore, the power source tends to be prematurely consumed due to the circuit design. Display of control as well as arithmetic operation also creates problems.

SUMMARY OF THE INVENTION

According to the invention, a camera having a camera body and an interchangeable lens engageable with the camera body has an improved contact arrangement between camera body and lens. A lens mount has a first flat surface, a camera mount engages a lens mount to join the lens to the camera body, and the camera mount has a second flat surface abutting the first flat surface when the lens mount engages the camera mount. One or more first electrical contacts in the lens mount are movable normal to the first surface between a retracted position approximately flush with the first surface and an extended position projecting from the first surface. A spring urges the one or more first contacts toward the extended position. One or more stationary second electrical contacts in the camera mount open toward the second surface without protruding therefrom in alignment with the respective one or more first contacts when the lens mount engages the camera mount so the one or more first contacts normally bear against the respect one or more second contacts.

In one aspect of the invention, a manually actuated device retracts the one or more first contacts into a position spaced from the respective one or more second contacts.

In another aspect of the invention, the lens mount and the camera mount are electrically conductive and a manually actuated device connects and disconnects the one or more first contacts electrically to and from the lens mount to make and break electrical contact between the one or more second contacts and the mounts.

Preferably, the camera additionally comprises a plurality of third contacts in the camera mount movable normal to the second surface between a retracted position approximately flush with the second surface and an extended position projecting from the second surface, a spring for urging the third contacts toward the extended position, and a plurality of stationary pins in the lens mount opening toward the first surface without protruding therefrom. The pins are in alignment with the respective third contacts, which bear against the respective pins when the lens mount engages the camera mount. Selective ones of the pins are conductive and the remainder of the pins are insulative.

BRIEF DESCRIPTION OF THE DRAWING

The features of the specific embodiments of the best mode contemplated of carrying out the invention are illustrated in the drawing, in which.

DETAILED DESCRIPTION OF THE SPECIFIC EMBODIMENTS

The present invention provides an electrical contact arrangement enabling the desired transmission and readout of specific diaphragm value information simultaneously when the lens has completely been mounted on the camera body and thereupon the circuit is energized, in AUTO photographing, without the previously mentioned problems, particularly, transmission of erroneous specific diaphragm value information due to the mounting operation of the lens.

According to the present invention, an electrical contact arrangement is provided in a lens interchangeable camera to transmit specific diaphragm values and switching information of individual interchangeable lenses, said contact agreement comprising electrical contacts arranged on mount surfaces of each lens and the camera body, respectively; a first group of electrical contacts serving for transmission of the information concerning the specific diaphragm values are so arranged that, on the camera body, they are normally biased to project from the associated mount surface while, on the lens, they are fixed against projection from the associated mount surface; a second group of electrical contacts serving for transmission of the switching information are so arranged that, on the camera body, they are fixed against projection from the associated mount surface while, on the lens, they are normally biased to project from the associated mount surface; and operation of a switching member causes an electrical circuit to be closed or opened through the second group of electrical contacts.

Figure 1A:
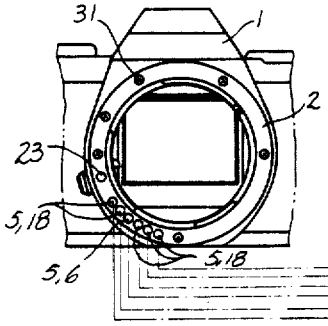
FIGS. 1A and 1B are respectively, a front view of a camera body and a perspective view of a lens barrel to be engaged with the camera body.
Figure 1B:
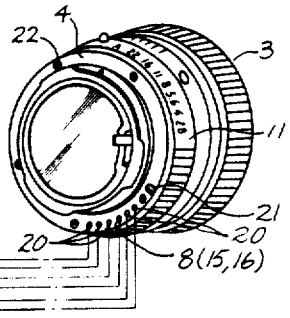

The present invention will be described more in detail with reference to preferred embodiments illustrated by the accompanying drawings. FIG. 1A is a front view partially showing a camera body 1 provided with a mount 2 comprising a brass plated piece treated to give it an electrical conductivity and secured by screws 31 on the camera body 1. FIG. 1B is a perspective view showing a lens barrel 3 to be coupled to the mount 2 of the camera body 1 shown by FIG. 1A. This lens barrel 3 also is provided with a mount 4 comprising a brass plated piece treated to give it an electrical conductivity and secured by screws 22 on lens barrel 3. These mounts 2, 4 are respectively provided with electrical contacts arranged in pairs so that the electrical contacts of each pair lie on the respective mounts in mutually aligned opposed relationship to each other. These electrical contacts comprise the pairs serving to transmit the information depending upon the manner in which the camera is to be used, i.e., AUTO or MANUAL, from the lens to the camera body 1 and the pairs serving to transmit the information concerning specific diaphragm values (fully opened diaphragm value and fully closed diaphragm value) of the individual lenses in the form of electrical current or other electrical quantity determined by electrical factors such as a resistance value.

The lens barrel 3 shown by FIG. 1B is coupled by a bayonet connection as seen in FIGS. 1A and 1B in a wellknown manner to the camera body 1. After rotating the lens barrel 3 to engage the bayonet connection, a lock pin 23 biased to project from the mount 2 engages a lock groove 21 formed in the mount 4 to fix the respective electrical contacts of each pair in the relationship of mutual opposition, i.e., into alignment and electrical contact with each other.

Figure 2:
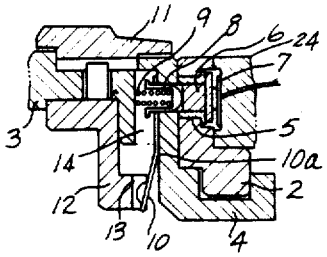
FIG. 2 is a side-sectional view of a portion of the camera body and lens of FIG. 1 illustrating the AUTO/MANUAL switching contacts during AUTO photographing.
Figure 3:
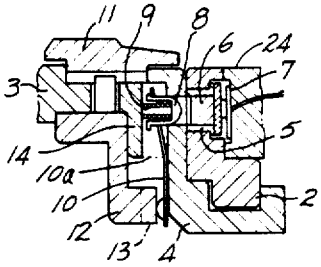
FIG. 3 is a side-sectional view of the portion of the camera body and lens of FIG. 2 illustrating the switching contacts during manual photographing.

The respective mounts and the electrical contacts arranged thereon according to the present inventiion have a unique construction as shown by FIGS. 2 through 5. First, the contact arrangement for AUTO/-MANUAL switching will be described in detail with reference to FIGS. 2 and 3. FIG. 2 shows the contact position when the switching member, such as a diaphragm operating ring 11 is operated for AUTO photographing and FIG. 3 shows the contact position when said switching member is operated for MANUAL photographing.

On the camera body 1, each contact pin 6 is insulated from the mount 2 of the camera body 1 by a collar 5. Each pin 6 is in electrical contact with a base plate 7 which is, in turn, connected to an electrical circuit (not shown). The base plate is mounted on a support member 24. Each pin 6 is fixed within collar 5 as shown to lie flush with or slightly depressed from the surface of mount 2 that abuts mount 4. Each contact pin 8 is received in a hole formed in the mount 4 of the lens and is biased by a spring 9 to project from the surface of said mount 4 of the lens. Contact pin 8 thus is movable between a retracted position approximately flush with the flat surface of mount 4 that abuts mount 3 and an extended position projecting from the surface of mount 4. A switching plate 10 has at one end a hole through which said contact pin 8 passes and has at its other end a bent portion 10a extending between mount 4 and a relay ring 12 adapted to be rotated together with the diaphragm operating ring 11. Reference numeral 14 designates a notched groove adapted to limit rotation of the switching plate 10 around the contact pin 8. When ring 11 is in the AUTO position, the switching plate 10 engages a recess 13 formed in the relay ring 12 and, as a result, the contact pin 8 is now influenced only by the spring 9, which urges pin 8 out of mount 4. Thus, contact pin 8 of the lens projects from the surface of mount 4 and engages the contact pin 6 on the camera body 1 to close the circuit as shown in FIG. 2. When the diaphragm operating ring 11 is rotated from the position of AUTO to the position of MANUAL preparatory to MANUAL photographing, the extremity of the bent portion 10a which had engaged recess 13 is then forced out of recess 13 and toward mount 4 by ring 12. As a result, the switching plate 10 pivots about the base of bent portion 10a so that the contact pin 8 captured by switching plate 10 is retracted into mount 4 and thereby disengages contact pin 6 of the camera body 1 to open the circuit as shown in FIG. 3.

Figure 4:
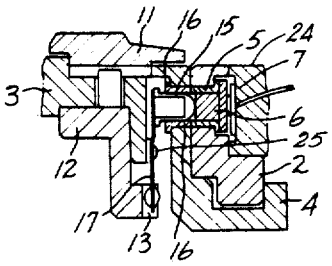
FIG. 4 is a side-sectional view of a portion of the camera body and lens of FIG. 1 illustrating an alternative embodiment of the switching contacts.

FIG. 4 illustrates another embodiment of AUTO/-MANUAL switching contacts in a vertical section taken along the essential portion of the arrangement. Each contact pin 15 is insulated by a collar 16 from the mount 4 of the lens and is biased by a free end of an electrically conductive flat contact spring 17 fixed to the lens barrel 3 by a screw 25 so that said contact pin 15 is urged to project outwardly from the surface of the mount 4 of the lens. FIG. 4 illustrates the arrangement as set to the MANUAL position, in which a lower end of the contact spring 17 engage a recess 13 formed in the relay ring 12 to disconnect said contact spring 17 engages a recess 13 formed in the relay ring 12 to disconnect said contact spring 17 from the mount 4 of the lens and thus to open the circuit. When the diaphragm operating 11 is rotated from MANUAL to AUTO position, a projection of the relay ring 12 adjacent to recess 13 forces the lower end of the contact spring 17 into contact with the mount 4 of the lens to close the circuit.

Figure 5:
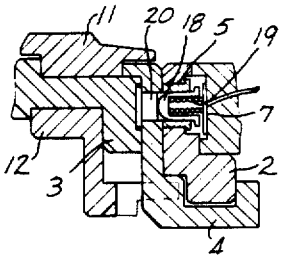
FIG. 5 is a side-sectional view of part of the camera body and lens of FIG. 1 illustrating the specific diagram value contacts for communicating diaphragm values to the camera body.

FIG. 5 illustrates a contact arrangement for transmission of the specific diaphragm values in a vertical section taken along the essential portion of the camera body 1 and the lens barrel 3 coupled thereto. Each contact pin 18 is insulated by a collar 5 from the mount 2 of the camera body and is biased by a spring 19 to project outwardly from the surface of the mount 2 associated with the camera body 1. Each contact pin 18 is electrically connected to the base plate 7. Each pin 20 is stationarily arranged on the mount 4 of the lens; if such pin 20 is made of a conductor (metal) the circuit is closed to mount 4 and if such pin 20 is made of an insulator (plastic), the circuit is opened to mount 4 as the lens is coupled to the camera body. Thus, the desired switching is enabled, depending on whether each pin 18 is a conductor, i.e., a binary "one", or an insulator, i.e., a binary "zero." When this pin 20 is utilized to close the circuit, said pin 20 can be replaced by the lens mount 4, since the latter is made of electrically conductive material. It should be realized that, when the specific diaphragm values are subjected to analog processing, a specific resistance is used and, when said specific diaphragm values are digitally processed, no contact for an ON-signal is required.

The contact arrangement according to the present invention is constructed as mentioned above and provides the following effects. The electrical contacts on the mount 4 of the lens can be discretionarily arranged and transmission of the information concerning the mode conversion or switching between AUTO and MANUAL can be accomplished upon complete coupling of the lens to the camera body, since the pins 20 serving for transmission of the specific diaphragm values are stationarily provided while the contacts 8 or 15 for AUTO/MANUAL switching are movably provided. Furthermore, provision of the electrical contacts on the mutually opposed surfaces of the respective mounts 2 and 4 both being conductive leads to various advantages as follows:

(a) it is possible to arrange a plurality of contacts (increase the number of information items);

(b) the precision at which the respective pairs of electrical contacts are engaged with each other is improved;

(c) influence upon rear lens groups is eliminated;

(d) no contact for ON-signal is required if the specific diaphragm value signals are digitally processed, facilitating assembling thereof;

(e) the electrical contacts on the lens for transmission of AUTO/MANUAL switching, if the mounts are normally in engagement with each other (shown by FIGS. 2 and 3), are turned ON or OFF depending upon projecting or not projecting of the contact pin 8 with respect to the mount 4 of the lens and, in the embodiment of FIG. 4, the contact spring 17 provided on the mount 4 of the lens enables ON/OFF switching so that neither ordinary switch nor lead wire is required and assembling thereof is accordingly facilitated; and (f) no electrical contact for earthing.

What is claimed is:

1. In a camera having a camera body and an interchangeable lens engageable with the camera body, the improvement comprising:

a lens mount having a first flat surface;

a camera mount engaging the lens mount to join the lens to the camera body, the camera mount having a second flat surface abutting the first flat surface when the lens mount engages the camera mount;

[one or more] *a* first electrical [contacts] *contact* in the lens mount movable normal to the first surface between a retracted position approximately flush with the first surface and an extended position projecting from the first surface;

spring means for urging the [one or more] first [contacts] *contact* toward the extended position;

[one or more] *a* stationary second electrical [contacts] *contact* in the camera mount opening toward the second surface without protruding therefrom in alignment with the [respective one or more] first [contacts] *contact* when the lens mount engages the camera mount so the [one or more] first [contacts] *contact* normally [bear] *bears* against the [respective one or more] second [contacts] *contact*; [and]

means for manually retracting the [one or more] first [contacts] *contact* into a position spaced from the [respective one or more] second [contacts.] *contact;*

*a plurality of third contacts in the camera mount movable normal to the second surface between a retracted position approximately flush with the second surface and an extended position projecting from the second surface;*

*spring means for urging the third contacts toward the extended position; and*

*one or more stationary insulative regions in the lens mount opening toward the first surface without protruding therefrom in alignment with one or more of the third contacts so said one or more third contacts contact the respective one or more insulative regions when the lens mount engages the camera mount.*

2. The improvement of claim 1, in which the lens mount and the camera mount are electrically conductive, the [one or more] first [contacts are] *contact is* electrically connected to the lens mount, and the [one or more] second [contacts are] *contact is* electrically insulated from the camera mount, thereby making electrical contact between the [one or more] second [contacts] *contact* and the mounts only when the [respective one or more] first [contacts abut] *contact abuts* the [one or more] second [contacts] *contact.*

3. The improvement of claim 2, in which the lens has a diaphragm operating ring rotatable from a manual position to an automatic exposure position and the retracting means comprises [one or more] *a* switch [plates for the respective one or more first contacts, each switch plate] *plate* having an angled leg movable between first and second positions, the switch plate retracting the first contact in the first position and releasing the first contact in the second position, and means responsive to the diaphragm operating ring for moving the angled leg into the first position when the diaphragm operating ring is in one position and moving the angled leg to the second position when the diaphragm operating ring is in the other position.

4. The improvement of claim 2, in which the lens has a diaphragm operating ring rotatable from a manual position to an automatic exposure position and the retracting means comprises [one or more] *a* switch [plates for the respective one or more first contacts, each switch plate] *plate* having an angled leg movable between first and second positions, the switch plate retracting the first contact in the first position and releasing the first contact in the second position, and means responsive to the diaphragm operating ring for moving the angled leg into the first position when the diaphragm operating ring is in the automatic position and moving the angled leg to the second position when the diaphragm operating ring is in the manual position.

[5. The improvement of claim 1, additionally comprising a plurality of third contacts in the camera mount movable normal to the second surface between a retracted position approximately flush with the second surface and an extended position projecting from the second surface, spring means for urging the third contacts toward the extended position, and a plurality of stationary pins in the lens mount opening toward the first surface without protruding therefrom in alignment with the respective third contacts so the third contacts bear against the respective pins when the lines mount engages the camera mount, selective ones of the pins being conductive and the remainder of the pins being insulative.]

6. The improvement of claim [4] *1*, in which the mounts are electrically conductive, the third [conductors] *contacts* are insulated from the camera mount, and the *insulative regions are insulative* pins [are electrically connected to] *imbedded in* the lens mount.

7. In a camera having a camera body and in interchangeable lens engageable with the camera body, the improvement comprising:

[an electrically conductive] *a* lens mount having a first flat surface;

an electrically conductive camera mount engaging the lens mount to join the lens to the camera body, the camera mount having a second flat surface abutting the first flat surface when the lens mount engages the camera mount;

[one or more] *a* first electrical [contacts] *contact* in the lens mount movable normal to the *first* surface between a retracted position approximately flush with the first surface and an extended position projecting from the first surface;

spring means for urging the [one or more] first [contacts] *contact* toward the extended position;

[one or more] *a* stationary second electrical [contacts] *contact* in the camera mount [electrically connected to the camera mount], the [one or more] second [contacts] *contact* opening toward the second surface without [proturding] *protruding* therefrom in alignment with the [respective one or more] first [contacts] *contact* when the lens mount engages the camera mount so the [one or more] first [contacts] *contact* normally [bear] *bears* against the [respective one or more] second [contacts] *contact;* means for insulating the [one or more] second [contacts] *contact* from the camera mount;

means for [mutually] *alternately* connecting and disconnecting the [one or more first contacts] *second contact* electrically to and from the [lens] *camera* mount *through the first contact;* [to make and break electrical contact between the one or more second contacts and the mounts.]

*a plurality of third contacts in the camera mount movable normal to the second surface between a retracted position approximately flush with the second surface and an extended position projecting from the second surface; spring means for urging the third contacts toward the extended position; and one or more stationary insulative regions in the lens mount opening toward the first surface without protruding therefrom in alignment with one or more of the third contacts so the one or more third contacts bear against the respective one or more insulative regions when the lens mount engages the camera mount.*

8. The improvement of claim 7, in which the lens has the diaphragm operating ring rotatable from a manual position to an automatic exposure position and the connecting and disconnecting means comprises [one or more] *a* switch [plates] *plate* for the [respective one or more] first [contacts, each] *contact, the* switch plate having an angled leg movable between first and second positions, the switch plate retracting the first contact in the first position and releasing the first contact in the second position *to bear against the second contact*, and means responsive to the diaphragm operating ring for moving the angled leg into the first position when the diaphragm operating ring is in one position and moving the angled leg to the second position when the diaphragm operating ring is in the other position.

9. The improvement of claim 7, in which the lens has a diaphragm operating ring rotatable from a manual position to an automatic exposure position, [each] *the* spring means *for the first contact* comprising a flat spring connected at one end to the first contact and means for securing the spring midway between its ends [(], the spring being movable at its other end, [)] and the connecting and disconnecting means comprises a *fourth* contact on the other end of the spring and means responsive to the diaphragm operating ring for moving the *fourth* contact between a position in which the *fourth* contact abuts the lens mount and a position in which the *fourth* contact is spaced from the lens mount.

10. The improvement of claim 9, in which the moving means comprises a relay ring attached to the diaphragm operating ring, the relay ring having a recess in which the *fourth* contact lies when spaced from the lens mount and a protrusion that engages the *fourth* contact when the fourth contact abuts the lens mount.

[11. The improvement of claim 7, additionally comprising a plurality of third contacts in the camera mount movable normal to the second surface between a retracted position approximately flush with the second surface and an extended position projecting from the second surface, spring means for urging the third contacts toward the extended position, and a plurality of stationary pins in the lens mount opening toward the first surface without protruding therefrom the pins in alignment with the respective third contacts so the third contacts bear against the respective pins when the lens mount engages the camera mount, selective ones of the pins being conductive and the remainder of the pins being insulative.]

12. The improvement of claim 10, in which the [mounts are] *lens mount is* electrically conductive, the third [conductors] *contacts* are insulated from the camera mount, and the *insulative regions are insulative* pins [are electrically connected to] *imbedded in* the lens mount.

13. Electrical contact arrangement in a lens interchangeable camera to transmit a specific diaphragm values and switching information of individual interchangeable lenses, said contact arrangement comprising electrical contacts arranged on mount surfaces of each lens and a camera body, respectively, wherein each of said mounts is made of an electrically conductive material; a first group of electrical contacts serving for transmission of the information concerning the specific diaphragm values are so arranged that, on the camera body, they are normally biased to project from the associated mount surface while, on the lens, they are fixed against projection from the associated mount surface; a [second group] *pair* of electrical contacts serving for transmission of the switching information are so arranged that, on the camera body, [they are] *one contact is* fixed against projection from the associated mount surface while, on the lens, [they are] *the other contact is* normally biased to project from the associated mount surface [and conductively connected to the mount associated with the lens]; and operation of a switching member causes an electrical circuit to be closed or opened through said [second group] *pair* of electrical contacts.

14. Electrical contact arrangement in a lens interchangeable camera to transmit specific diaphragm values and switching information of individual interchangeable lenses according to claim [12] *13*, wherein said [group] *pair* of electrical contacts serving for transmission of the switching information are switched by operation by the switching member between its first position at which the [contacts] *contact* on the lens normally under biasing effect actually [project] *projects* from the associated mount surface to close the circuit and its second position at which said [contacts retract] *contacts retracts* again into said associated mount surface to open the circuit.

15. Electrical contact arrangement in a lens interchangeable camera to transmit specific diaphragm values and switching information of individual interchangeable lenses according to claim [12] *13*, wherein said [group] *pair* of electrical contacts serving for transmission of the switching information are insulated from the mount associated with the lens and switched by a contact spring between its first position at which these contacts close the circuit and its second position at which they open the circuit.

16. Electrical contact arrangement in a lens interchangeable camera to transmit specific diaphragm values and switching information of individual interchangeable lenses according to claim [12] *13*, wherein the mount associated with the lens is provided with a stationary insulator with respect only to *an* OFF-signal when said specific diaphragm values are to be digitally transmitted.

*17. An interchangeable lens engageable with a camera body comprising:*

*a bayonet connection for engaging a camera body;*

*an annular lens mount having a flat surface surrounding the bayonet connection;* a first electrical contact in the lens mount movable normal to the flat surface between a retracted position approximately flush with the flat surface and an extended position projecting from the flat surface;

*spring means for urging the first contact toward the extended position; and*

*one or more stationary insulative regions in the lens mount opening toward the flat surface without protruding therefrom, the location of the insulative regions being representative of specific diaphragm values.*

*18. The lens of claim 17, additionally comprising:*

*a diaphragm operating ring rotatable from a manual position to an automatic exposure position; a switch plate for the first contact, the switch plate having an angled leg movable between first and second positions, the switch plate retracting the first contact in the first position and releasing the first contact in the second position, and means responsive to the diaphragm operating ring for moving the angled leg into the first position when the diaphragm operating ring is in the manual position and moving the angled leg to the second position when the diaphragm operating ring is in the automatic exposure position.*

*19. The lens of claim 17, in which the spring means comprising a flat spring connected at one end to the first contact, the lens additionally comprising a diaphragm operating ring rotatable from a manual position to an automatic exposure position, an insulative sleeve around the first contact, means for securing the spring midway between its ends, a fourth contact on the other end of the spring, an means responsive to the diaphragm operating ring for moving the fourth contact between a position in which the fourth contact bears against the lens mount and a position in which the fourth contact is retracted from the flat surface.*

*20. The lens of claim 23, in which the moving means comprises a relay ring attached to the diaphragm operating ring, the relay ring having a recess in which the fourth contact lies when retracted and a protrusion that engages the fourth contact to urge it against the lens mount.*

*21. The lens of claim 17, additionally comprising a lock groove form in the flat surface.*

*22. The lens of claim 17, in which the lens mount is electrically conductive and the insulative regions are insulative pins embedded in the lens mount.*

*23. An interchangeable lens engageable with a camera body comprising:*

*a bayonet connection for engaging a camera body;*

*an annular lens mount having a flat surface surrounding the bayonet connection;*

*a first electrical contact in the lens mount movable normal to the flat surface between a retracted position*

*approximately flush with the flat surface and an extended position projecting from the flat surface;*

*spring means for urging the first contact toward the extended position;*

*one or more stationary insulative regions in the lens mount opening toward the flat surface without protruding therefrom, the location of the insulative regions being representative of specific diaphragm values;*

*a diaphragm operating ring rotatable from a manual position to an automatic exposure position;*

*a switch plate for the first contact, the switch plate having an angled leg movable between first and second positions, the switch plate retracting the first contact in the first position and releasing the first contact in the second position; and*

*means responsive to the diaphragm operating ring for moving the angled leg into the first position when the diaphragm operating ring is in the manual position and moving the angled leg into the second position when the diaphragm operating ring is in the automatic exposure position.*

*24. An interchangeable lens engageable with a camera body comprising:*

*a bayonet connection for engaging a camera body;*

*an annular lens mount having a flat surface surrounding the bayonet connection;*

*a first electrical contact in the lens mount movable normal to the flat surface between a retracted position approximately flush with the flat surface and an extended position projecting from the flat surface;*

*spring means comprising a flat spring connected at one end to the first contact for urging the first contact toward the extended position;*

*one or more stationary insulative regions in the lens mount opening toward the flat surface without protruding therefrom, the location of the insulative regions being representative of specific diaphragm values;*

*a diaphragm operating ring rotatable from a manual position to an automatic exposure position;*

*an insulative sleeve around the first contact;*

*means for securing the spring midway between its ends;*

*a fourth contact on the other end of the spring; and*

*means responsive to the diaphragm operating ring for moving the fourth contact between a position in which the fourth contact bears against the lens mount and a position in which the fourth contact is spaced from the lens mount.*

*25. The lens of claim 17, additionally comprising means electrically connected to the first contact for indicating a first mode of camera operation, means electrically connected to the first contact for indicating a second mode of camera operation, and means for alternatively selecting the first mode or the second mode.*

*26. The lens of claim 17, additionally comprising a diaphragm operating ring rotatable from a manual position to an automatic exposure position, an electrically conductive switching member electrically connected to the first contact, means responsive to the diaphragm operating ring for placing the switching member in a first position when the diaphragm operating ring is in the manual position, and means responsive to the diaphragm operating ring for placing the switching member in a second position when the diaphragm operating ring is in the automatic exposure position.*

*27. The improvement of claim 1, in which the second contact is slightly depressed from the surface of the camera mount.*

*28. The improvement of claim 7, in which the second contact is slightly depressed from the surface of the camera mount.*

*29. Electrical contact arrangement in a lens interchangeable camera to transmit specific diaphragm values and switching information of individual interchangeable lenses according to claim 13, wherein the one contact of the pair of electrical contacts serving for transmission of the switching information is slightly depressed from the surface of the mount on the camera body.*

*30. The lens of claim 17, in which the lens mount is electrically conductive, the lens additionally comprising:*

*an insulative sleeve around the first contact to insulate the first contact from the lens mount;*

*a switching member movable between a first position representative of AUTO photograhing mode and a second position representative of MANUAL photographing mode; and*

*means for electrically connecting the contact to the lens mount in one position of the switching member and electrically disconnecting the contact from the lens mount in the other position of the switching member.*

*31. The lens of claim 30, additionally comprising a diaphragm operating ring rotatable from a manual position to an automatic exposure position, means responsive to the diaphragm operating ring for placing the switching member in the first position when the diaphragm operating ring is in the automatic exposure position, and means responsive to the diaphragm operating ring for placing the switching member in the second position when the diaphragm operating ring is in the manual position.*

*32. The lens of claim 17, additionally comprising:*

*a switching member movable between a first position representative of AUTO photographing mode and a second position representative of MANUAL photographing mode;*

*means for retracting the first contact into the lens mount when the switching member is in one position; and*

*means for freeing the first contact to project from the lens mount when the switching member is in the other position.*

*33. The lens of claim 32, in which the lens mount is electrically conductive, the lens additionally comprising means for electrically connecting the first contact to the lens mount.*

*34. The lens of claim 33, additionally comprising a diaphragm operating ring rotatable from a manual position to an automatic exposure position, means responsive to the diaphragm operating ring for placing the switching member in the first position when the diaphragm operating ring is in the automatic exposure position, and means responsive to the diaphragm operating ring for placing the switching member in the second position when the diaphragm operating ring is in the manual position.*

* * * * *